(12) United States Patent
Dempsey et al.

(10) Patent No.: US 10,190,265 B2
(45) Date of Patent: Jan. 29, 2019

(54) COMPOSITIONS AND METHODS FOR PELLETIZED RECYCLED ASPHALT SHINGLES

(71) Applicants: William P. Dempsey, Issaquah, WA (US); William R. Bailey, Tumwater, WA (US)

(72) Inventors: William P. Dempsey, Issaquah, WA (US); William R. Bailey, Tumwater, WA (US)

(*) Notice: Subject to any disclaimer, the term of this patent is extended or adjusted under 35 U.S.C. 154(b) by 0 days.

(21) Appl. No.: 16/007,753

(22) Filed: Jun. 13, 2018

(65) Prior Publication Data

US 2018/0291565 A1    Oct. 11, 2018

Related U.S. Application Data

(62) Division of application No. 14/639,079, filed on Mar. 4, 2015, now Pat. No. 10,030,338.

(60) Provisional application No. 61/966,791, filed on Mar. 4, 2014.

(51) Int. Cl.
| | |
|---|---|
| *E01C 7/18* | (2006.01) |
| *C08L 95/00* | (2006.01) |
| *E01C 19/10* | (2006.01) |
| *C09D 197/00* | (2006.01) |

(52) U.S. Cl.
CPC ............... *E01C 7/18* (2013.01); *C08L 95/00* (2013.01); *C09D 197/005* (2013.01); *E01C 19/1004* (2013.01); *Y02A 30/333* (2018.01)

(58) Field of Classification Search
CPC .......... E01C 7/18; E01C 19/1004; E01C 5/18; E01C 11/005; E01C 7/265; C09D 197/005; C08L 95/00
See application file for complete search history.

(56) References Cited

U.S. PATENT DOCUMENTS

| | | | | |
|---|---|---|---|---|
| 2,977,864 | A | | 4/1961 | Pullar |
| 3,891,585 | A | * | 6/1975 | McDonald ............... C08L 95/00 404/32 |
| 3,930,100 | A | * | 12/1975 | McDonald ............... C08L 95/00 404/32 |
| 5,223,031 | A | * | 6/1993 | Sugi ..................... C04B 20/1044 106/277 |
| 5,236,497 | A | * | 8/1993 | Grzybowski ........... C08L 95/00 106/271 |
| 5,460,649 | A | * | 10/1995 | Strassman ............... C04B 26/26 106/282 |
| 6,186,700 | B1 | | 2/2001 | Omann |
| 6,315,492 | B1 | * | 11/2001 | McIntosh ............... E01C 11/005 404/107 |
| 6,440,205 | B1 | | 8/2002 | Bailey et al. |
| 6,479,570 | B2 | | 11/2002 | Kamaishi et al. |

(Continued)

FOREIGN PATENT DOCUMENTS

| | | |
|---|---|---|
| CA | 2496823 A1 | 3/2004 |
| CA | 2608867 A1 | 11/2006 |

(Continued)

*Primary Examiner* — Abigail A Risic

(57) ABSTRACT

Recycled asphalt shingle pellets having a core pellet, which includes recycled asphalt shingle waste with a softening agent, and a shell coating, which includes a binder with an aggregate blend of virgin recycled asphalt shingle waste and hydrated lime.

14 Claims, 4 Drawing Sheets

(56) References Cited

U.S. PATENT DOCUMENTS

| | | | |
|---|---|---|---|
| 6,488,755 B1* | 12/2002 | Seyler | C08K 9/04 |
| | | | 106/272 |
| 6,824,600 B2 | 11/2004 | Bailey et al. | |
| 6,863,724 B2 | 3/2005 | Bailey et al. | |
| 7,303,623 B2 | 12/2007 | Bailey | |
| 8,182,726 B2 | 5/2012 | Bailey | |
| RE44,080 E | 3/2013 | Bailey et al. | |
| 8,404,164 B2 | 3/2013 | Sockwell | |
| 9,102,834 B2 | 8/2015 | Butz et al. | |
| 10,030,338 B2 | 7/2018 | Dempsey et al. | |
| 2001/0020058 A1* | 9/2001 | Kamaishi | C04B 20/12 |
| | | | 524/3 |
| 2003/0037704 A1 | 2/2003 | Bailey et al. | |
| 2003/0075078 A1 | 4/2003 | Bailey et al. | |
| 2006/0260508 A1 | 11/2006 | Bailey | |
| 2007/0054989 A1 | 3/2007 | Argenio | |
| 2008/0111540 A1* | 5/2008 | Targosz | G01N 33/42 |
| | | | 324/204 |
| 2008/0216712 A1 | 9/2008 | Bailey | |
| 2009/0272676 A1 | 11/2009 | Behelfer et al. | |
| 2010/0056669 A1 | 3/2010 | Bailey | |
| 2010/0275817 A1* | 11/2010 | Williams | C04B 24/08 |
| | | | 106/671 |
| 2011/0082240 A1 | 4/2011 | Crews | |
| 2011/0233105 A1 | 9/2011 | Bailey | |
| 2013/0008348 A1* | 1/2013 | Sockwell | C04B 26/26 |
| | | | 106/668 |
| 2013/0116364 A1 | 5/2013 | Butz et al. | |
| 2013/0136539 A1 | 5/2013 | Aardema | |
| 2013/0199410 A1 | 8/2013 | Maldonado et al. | |
| 2014/0294502 A1 | 10/2014 | Bowers | |
| 2015/0252534 A1 | 9/2015 | Dempsey et al. | |
| 2016/0145434 A1* | 5/2016 | Gillespie | C08L 95/00 |
| | | | 53/428 |

FOREIGN PATENT DOCUMENTS

| | | |
|---|---|---|
| CA | 2409407 C | 11/2008 |
| CA | 2734869 A1 | 3/2010 |
| CA | 2454595 C | 1/2012 |
| CN | 1262603 A | 8/2000 |
| CN | 1678704 A | 10/2005 |
| DE | 60224053 T2 | 12/2008 |
| EP | 1297073 A1 | 4/2003 |
| EP | 1534794 A2 | 6/2005 |
| EP | 1417267 B1 | 12/2007 |
| EP | 2318462 A4 | 2/2015 |
| EP | 2860224 A1 | 4/2015 |
| ES | 2298392 T3 | 5/2008 |
| JP | 2003519170 A | 6/2003 |
| JP | 2004537665 A | 12/2004 |
| JP | 2005536605 A | 12/2005 |
| JP | 4118805 B2 | 7/2008 |
| JP | 4410110 B2 | 2/2010 |
| KR | 20110073435 A | 6/2011 |
| RU | 2531816 C2 | 10/2014 |
| WO | 2001090250 A1 | 11/2001 |
| WO | 2003014231 A1 | 2/2003 |
| WO | 2004018554 A3 | 7/2004 |
| WO | 2006127683 A2 | 11/2006 |
| WO | 2010025212 A1 | 3/2010 |
| WO | 2012167152 A1 | 12/2012 |

* cited by examiner

COMPOSITIONS AND METHODS FOR PELLETIZED RECYCLED ASPHALT SHINGLES

CROSS-REFERENCE TO RELATED APPLICATIONS

This application is a divisional of U.S. patent application Ser. No. 14/639,079 filed Mar. 4, 2015, which claims the benefit of U.S. Provisional Patent Application No. 61/966,791, filed Mar. 4, 2014, both of which are incorporated here by reference in their entireties to provide continuity of disclosure.

BACKGROUND

Recycled asphalt waste is a known additive for the production of asphaltic paving compositions used in the construction of roads, highways, bridges, airport runways, parking lots, playgrounds, and other rolling surfaces that require a bituminous coating. An emphasis in using recycled asphalt shingles (RAS) in pavement construction has reduced the environmental liability of RAS and has further reduced the amount of virgin asphalt used in pavement construction. In the U.S., it is estimated that about 11 million tons of RAS are produced annually. The asphalt in RAS and also recycled asphalt pavement (RAP) is known to be much stiffer than virgin asphalt. This has led to increased stiffness of asphaltic paving compositions. The stiffer the paving composition, the more difficult it is to place and the more susceptible it is to cracking at lower temperatures.

Typical petroleum based, softening agents are known to enable the use of larger amounts of recycled asphalt waste, such as RAS and RAP in the formulation of a performance grade (PG) asphalt. The cost of the petroleum based softening agents can be expensive and their use continues to raise environmental concerns. As such, bio-oils and other organic materials are now being used as asphalt softening agents. Some of the various bio-oils and organic materials include vegetable oils and starches, as well as lignin and cellulose.

Storage stable asphalt pellets made from RAS have also advanced the pavement industry. For example, in the production of prilled pellets from RAS, the non-shingle debris, roofing felt, asbestos containing material, and fiberglass can be removed to form a quality material RAS pellet. RAS pellets that meet these quality material requirements are easier to handle and transport, and they can be stored in stockpiles at job sites and asphalt plants. In addition, the pellets are relatively the same size, enabling more accurate feed rates.

In asphalt production, final RAS product is subject to state law. Ostensibly, three commonly regulated requirements are gradation, extraneous waste materials, and moisture content. An example of a gradation requirement is a minimum percent; i.e., 95% or more of RAS pass a ⅜ inch sieve test. Regarding the extraneous waste materials requirement, this often includes a showing that the final RAS product is substantially free of extraneous waste materials and entirely free of whole, intact nails. The moisture content requirement usually requires moisture levels to not be considered excessive so as to negatively impact specified hot mix asphalt (HMA) moisture limits.

As more and more recycled asphalt waste is produced, there is a need to improve RAS containing asphalt mixes and improve RAS rheological properties to enable a larger amount of RAS to be used in a PG asphalt mix.

SUMMARY

Accordingly, the present disclosure is directed to an asphalt pavement having a first stage mix comprising recycled asphalt shingles material and a softening agent, in which the softening agent is selected from the group consisting of biofuels, bio-oils, and combinations thereof, a second stage mix comprising virgin recycled asphalt shingles material, hydrated lime, and a water-resistant modified lignin sulfate binder, and a performance grade neat asphalt, in which the performance grade neat asphalt is combined with a combination of the second stage mix with the first stage mix.

The present disclosure is also directed to an asphalt pavement having a first stage mix comprising recycled asphalt shingle waste and a softening agent, in which the softening agent is selected from the group consisting of biofuels, bio-oils, and combinations thereof, a second stage mix comprising virgin recycled asphalt shingle waste, hydrated lime, and a water-resistant modified lignin sulfate binder, and a performance grade neat asphalt, in which the performance grade neat asphalt is combined with a combination of the second stage mix with the first stage mix.

Additionally, the present disclosure is directed to an asphalt pavement having recycled asphalt shingle waste and a softening agent combined in a first mixture, virgin recycled asphalt shingle waste, hydrated lime, and a water-resistant modified lignin sulfate binder combined in a second mixture, and a performance grade neat asphalt, in which the performance grade neat asphalt is combined with the first mixture and the second mixture.

It should be understood that the summary above is provided to introduce in simplified form a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or herein contained.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present disclosure provides for RAS pellets in asphalts that improve physical and rheological characteristics such as stiffness, effective temperature range, and low temperature properties. Embodiments of the present disclosure provide for the addition of biodiesel in the formulation of a core pellet for a two-stage pellet forming process in order to minimize potential detrimental low-temperature effects of RAS, while still allowing for higher stiffness at high temperatures. Some embodiments also provide for core pellets having a shelled coating as a binder and water-resistant agent from the result of the second stage of the two-stage pellet forming process. Embodiments of the present disclosure facilitate the sustainability of RAS and are useful in the production of asphalt blends, mixes, and compositions.

DEFINITIONS

The term "asphalts" refers to asphalt blends, asphalt mixes, asphalt pavements, and other asphalt compositions that contain bitumen.

The term "RAS" stands for "recycled asphalt shingles" and refers to manufacturer asphalt shingle waste; tabs or seconds cut out from the production of new shingles; new shingles that do not meet quality standards; and, consumer asphalt shingle waste, including tear-offs from re-roofing jobs or demolition debris.

The term "pellet" refers to a small, rounded, compressed mass of RAS and other materials, including but not limited to diluents, softening agents, aggregates, and binders, sized to ⅜ inch minus and qualified to meet American Association of State Highway and Transportation Officials (AASHTO) and Federal and State law standard test procedures.

The term "PG" stands for "performance grading" or "performance grade" asphalt, which is based on the idea that the properties of the binder used in a hot mix asphalt (HMA) or a warm mix asphalt (WMA) should be related to the conditions under which it is used as paved coating for a rolling surface. PG is a product of "Superpave specifications" or "Superpave designs methods" which incorporate performance based characterization of asphalt materials with respect to environmental conditions.

The term "biodiesel" refers to various grades of vegetable oil or animal fat based diesel fuel consisting of long-chain alkyl esters, or blends of biodiesel and conventional hydrocarbon based diesel.

All weights, parts, and percentages used herein are based on weight unless otherwise specified.

Non-limiting embodiments will now be described in detail, by way of example, with reference to the drawings.

Figure 1:
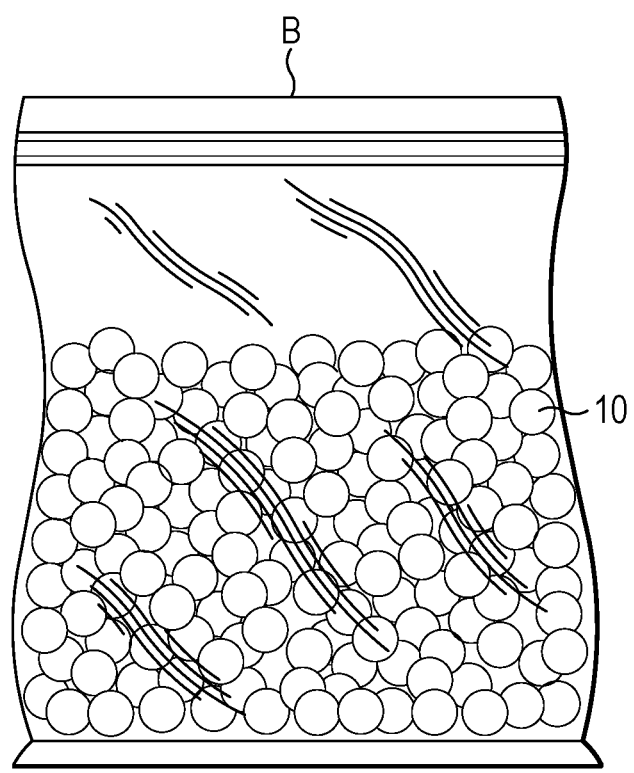
FIG. 1 is a front side view of a bag containing asphalt pellets derived from recycled asphalt shingles (RAS), according to embodiments of the invention.

Turning to the drawings, where like reference numerals represent like parts throughout the various drawing figures, FIG. 1 is directed to a non-limiting embodiment of pellets 10 made from RAS. The pellets 10 are suitable for storage and transportation at a wide range of ambient temperatures because of their outer coating. The asphalt pellets can be stored at the production site or at a remote site and can be transported and stored in piles or within containers such as sacks, tanks, silos, and barrels. By way of example, FIG. 1 illustrates a quantity of pellets 10 that are stored in a bag B.

RAS, especially consumer asphalt shingle waste contains aged asphalt whose properties vary from the asphalt in manufacturer asphalt shingle waste. The asphalt in consumer asphalt shingle waste may be hardened from oxidation and the volatilization of the lighter organic compounds. Further, consumer asphalt shingle waste material is often contaminated with nails, paper, wood, and other debris. After the shingle waste materials are removed from the roof, then, often the materials are transported to a production site where the shingles are sorted and tested for asbestos content, followed by removal of contaminants and finally ground to a specified size. This is typically performed at shingle recycling facilities or asphalt plants equipped with the necessary recycling equipment.

By pelletizing the RAS prior to transport, the fiberglass dust and other debris inherent to tear-off shingles is mitigated. Further, by adding a moisture-resistant softening agent, such as biodiesel to the pellet binder, the fiberglass dust dispersal in the air is alleviated, and the age-hardened oil in the RAS becomes revitalized. In this manner, hard, brittle bitumen is converted to softer, more vibrant bitumen with better adhesion and cohesion properties through the reintroduction of the maltene fraction of the bitumen (i.e., the oily, resinous component of asphalt that remains when the asphaltenes are removed).

In a non-limiting embodiment, storage stable RAS pellets are formed in a two-stage process. In one aspect of the embodiment, about 5% biodiesel is contacted with about 95% RAS content in the asphalt pelletizer to form a RAS core pellet. It is contemplated that the biodiesel content can be from about 5 weight % (wt. %) to about 10 wt. %, and the RAS content from about 90 wt. % to 95 wt. % of the RAS core pellet. The biodiesel may be one of a variety of commercially available biodiesels or biodiesel-petrol blends. Representative examples of commercially available biodiesels and biodiesel manufacturers include, but are not limited to, Sequential Biofuels, in Salem, Oreg. or the like. It is further contemplated that any suitable biofuel made from components other than petroleum, such as alcohol, methanol, soy, corn, animal fat, etc. may be used. In addition to biofuels, other known softening agents acting as diluents and characterized as having a high flash point; e.g., above 140 degrees F. are contemplated by the present embodiment.

Due to the presence of high concentrations of agglomerates of asphaltenes in RAS, asphalt mixes made with RAS are often characterized by an increase of high and a decline of low-temperature characteristics and therefore, an undesired increase in PG grading. Without being bound by theory, it is believed that the addition of a softening agent (such as biodiesel described above, by way of example) acts as an asphaltene dispersing agent and that a better distribution of asphaltenes in maltene phase helps to improve rheological and physical properties of RAS, thereby producing a PG compatible asphalt product.

In another aspect of a non-limiting embodiment of e invention, a RAS shelled pellet can be formed from the RAS core pellet, the addition of a virgin RAS and hydrated lime blend, and the addition of a water-resistant modified lignin sulfate binder. About 60 wt. % virgin RAS and about 40 wt. % hydrated lime are contacted with the RAS core pellet in a second asphalt pelletizer. Next, the binder is added and includes about 2 wt. % water-resistant agent, about 49 wt. % lignin, and about 49 wt. % water. It should be understood that any suitable lignin and water blend, such as Ligno-Tech's Norlig G calcium-sodium lignosulfonate may be used. A representative example of commercially available water-resistant agents includes Zycosoil™ manufactured Zydex® and sold by Sales and Distribution Services, Inc., in Yorba Linda, Calif. Any suitable, commercially available water-resistant agent, or independently, formulated water-resistant agent known in the industry may be used.

In a non-limiting embodiment, the two-stage pellets (RAS core pellet and RAS shelled pellet described above) are made up of about 85 wt. % of RAS core pellet and about 15 wt. % of RAS shelled pellet.

Figure 2:
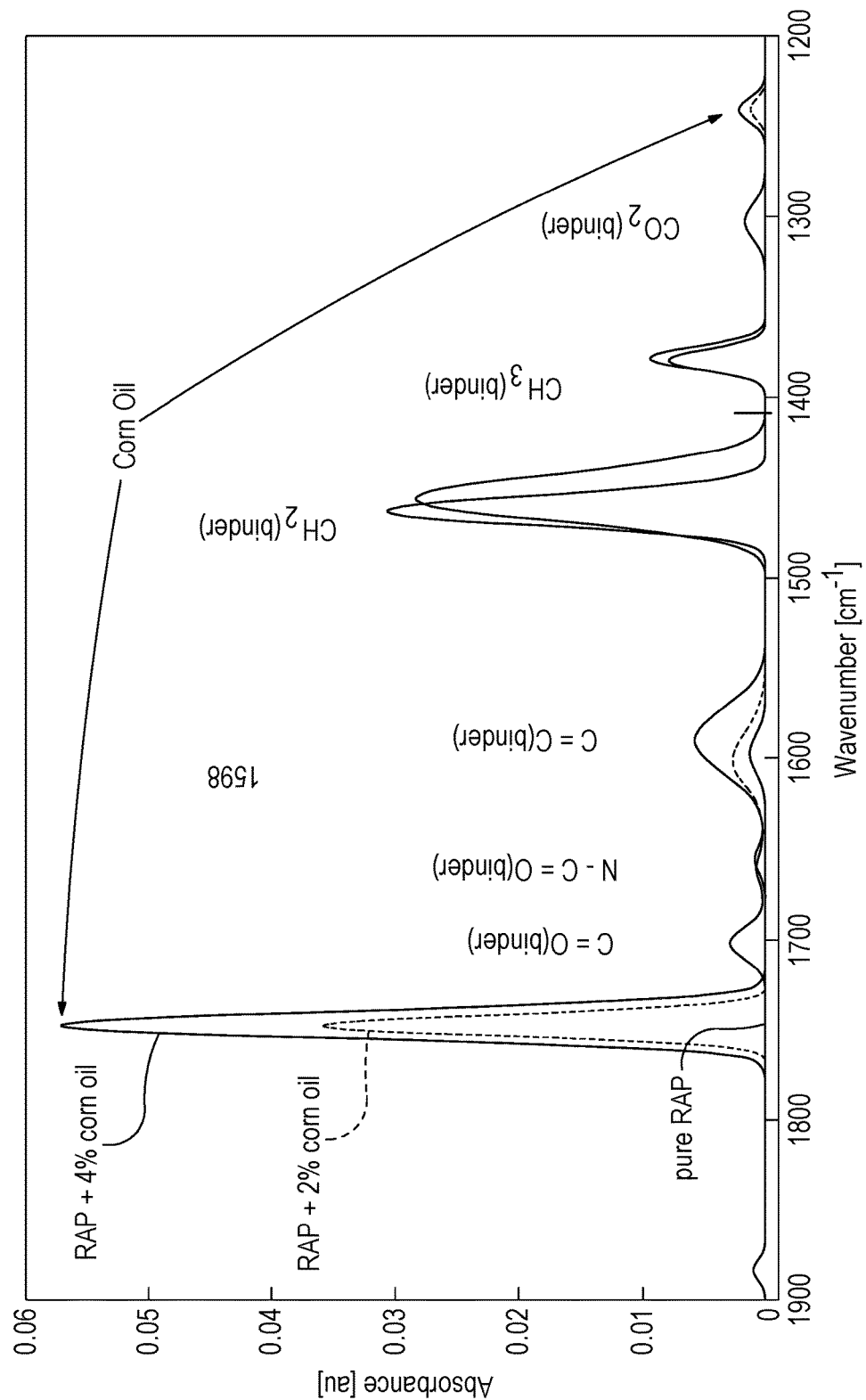
FIG. 2 is a spectrograph from a Fourier transform infrared (FTIR) analysis of exemplary recycled asphalt waste material, according to embodiments of the invention.

In reference to FIG. 2, the analyte peaks of about 2% and 4% Absorbance Units at 1750 nanometers, identify and quantify age-hardened asphalt shingle bitumen. Every bitumen is different according to its character and place of origin so the optimal quantity ratios will not be the same for all bitumen and need to be adjusted accordingly for asphalt production. The binder portion of the carbon chain is identified at 1450 nanometers, as shown in FIG. 2. Its measurable Absorbance Unit is the same regardless of how much bio-oil has been incorporated into the pellets.

Figure 3:
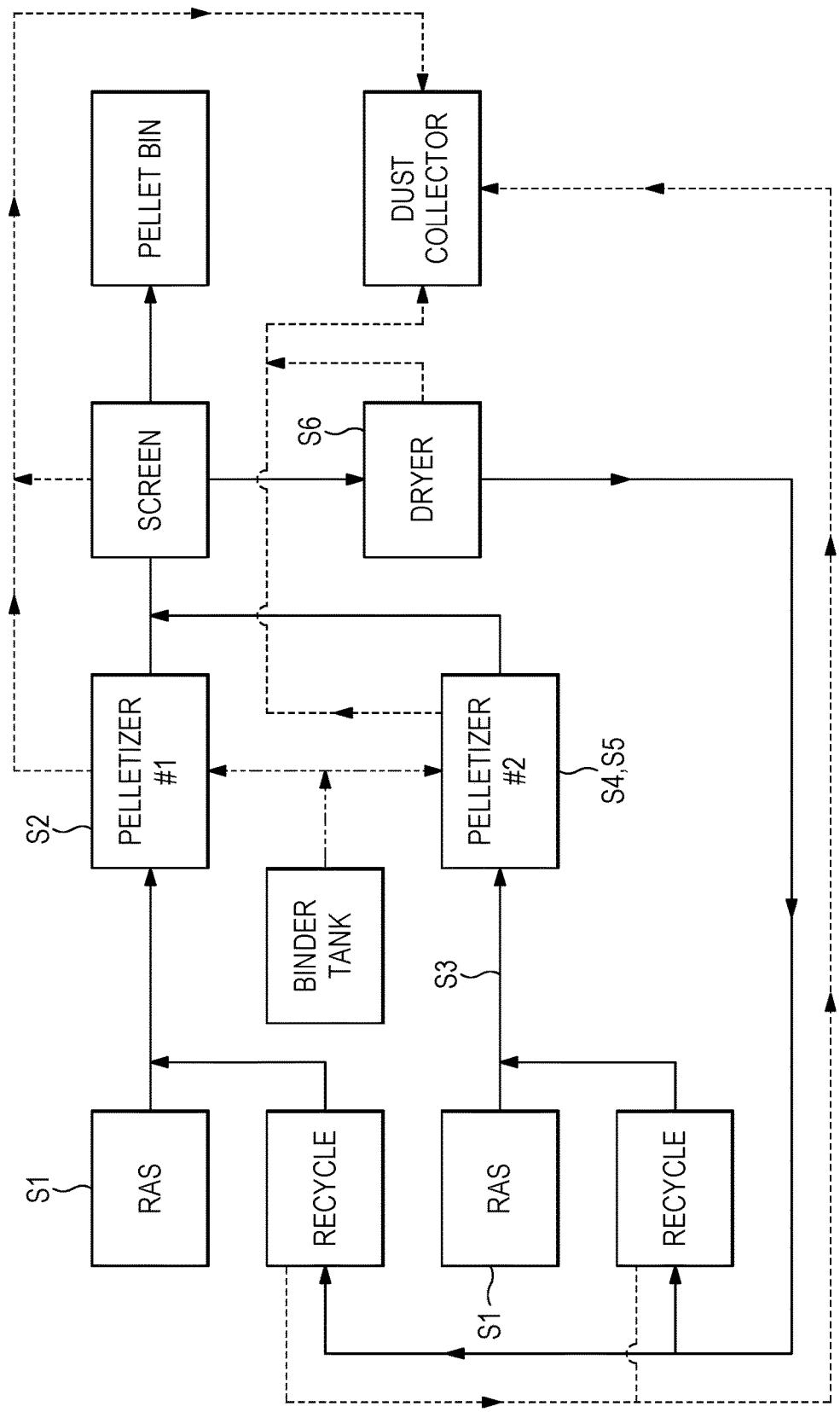
FIG. 3 is a diagrammatic view of a circuit for forming RAS pellets shown in FIG. 1, according to embodiments of the invention.

With reference to FIG. 3, a non-limiting RAS pellet circuit includes, grinding waste, asphalt shingles to form comminuted particles S1; agglomerating or briquetting the comminuted particles formed in step 1 with an additive biodiesel in a first pelletizer to form pellets (i.e., core pellets) S2; coating the pellets from step 2 with a mineral, e.g., silica powder to prevent them from sticking together while they are being transported to a second pelletizer S3; agglomerating the pellets from step 3 with additional comminuted particles from step 1 and a virgin RAS-hydrated lime blend in the second pelletizer to form shelled pellets S4; coating the shelled pellets formed in step 4 with a waterproof material S5; drying the waterproofed, shelled pellets from step 5 S6. Once dried and ready for storage, the pellets from S6 can be stockpiled or placed into containers (e.g., bags, boxes, super sacks, trucks or railcars) for shipment.

In the non-limiting embodiment of FIG. 3, the method includes, during the formation of a second pelletizing disk, making the smaller sized (RAS core) pellets larger by coating them with a blend of more comminuted waste shingles (virgin RAS), pH-neutral, lignosulfonate binder, such as LignoTech's Norlig G calcium-sodium lignosulfonate, and water ($H_2O$). Then, adding about 0.05 wt. % to about 0.5 wt. % of a water-resistant agent; e.g., Zycosoil™ results in a larger pellet, sized from about ½ inch to about 1 inch in diameter.

With respect to the first pelletized disk, there is no need to make the pellets large. Smaller pellets sized to about ¼ inch to about ⅜ inch or about ½ inch in diameter are sufficient. After the pellets are dropped out of the pelletizing disc onto a chain or vibrating conveyor, they are slightly dusted with mineral powder, including but not limited to, hydrated lime, talc, powdered limestone or other mineral filler, then placed into the second pelletizing disk or briquetting unit where more RAS/hydrated lime blend and water-resistant agent are added to build the shell coating, thereby resulting in a final sized pellet of major dimension from about ½ inch to about 1 inch.

The finished pellet is a water-resistant, bitumen product suitable for storage in most climate weather conditions. The pellet includes biodiesel as a softening agent to reinvigorate the harder binders in the RAS and eliminate airborne fiberglass particles during pellet formation. Consequently, the industry is impacted by improved handling and long distance shipping properties, and increased safety for workers and their environment.

It is contemplated that additional recycled asphalt waste materials, such as recycled asphalt pavement (RAP) (not shown) or combinations of RAS and RAP could be integrated in the circuit of FIG. 3.

It is contemplated that a sensor for radio frequency identification (RFID) (not shown) could be pelletized in an embodiment to monitor moisture content, time of manufacture, and structural health of the resultant final product pavement. Embedding sensing capabilities directly into the construction material during the manufacturing and deployment process is known in the pavement industry. Microelectromechanical sensors and systems (MEMS) technology and wireless sensor networks (not shown) are known to provide opportunities for long-term, continuous, real-time structural health of pavements and bridges. In a non-limiting embodiment, a clay-coated or plastic covered MEMS could act as a RFID pellet that is formed and agglomerated as part of a batch; e.g., every 20 tons of final RAS produced. The sensor would then become part of the HMA and later accessed for data when embedded in an asphalt road or paved asphalt surface.

In another non-limiting embodiment, a colorant, as a source indicator may be added during the formation of the shelled pellet in the second pelletizer or to the finished pellet composition.

Figure 4:
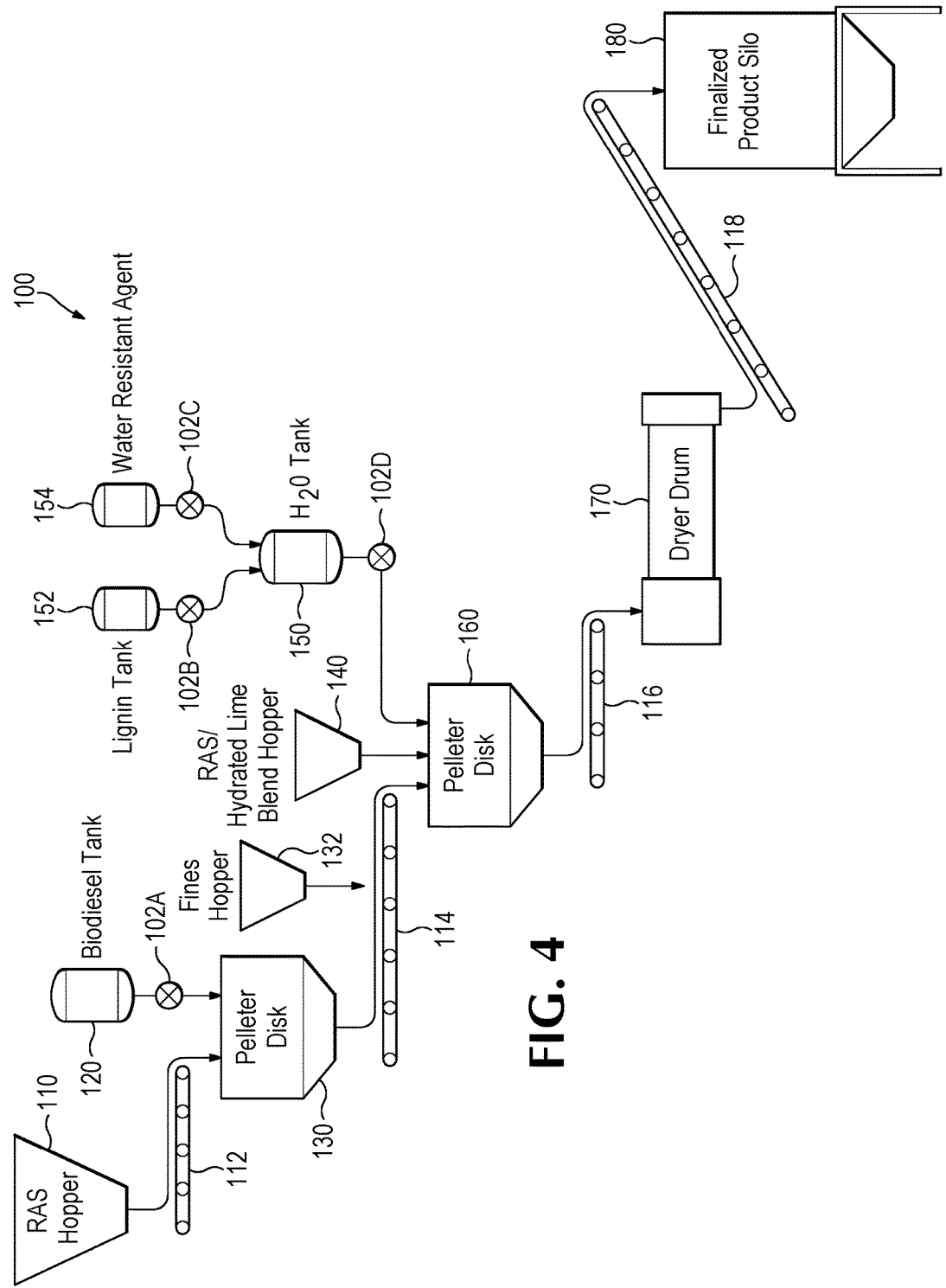
FIG. 4 is a diagrammatic view of a system for pelletizing RAS pellets shown in FIG. 1, according to embodiments of the invention.

Referring to FIG. 4, a RAS pelleting sequence system 100 is illustrated. In a first-stage (RAS core) pelleting process, RAS from RAS Hopper 110 is fed to Pelleter Disk 130 via weigh belt 112 and combined with spray metered 102A biodiesel from Biodiesel Tank 120. Next, the RAS core pellet is transported via belt 114, while dusted with mineral powder from Fines Hopper 132, to Pelleter Disk 160 for the second stage of the process.

Pelleter Disks 130, 160 can be any suitable pelletizer known in the industry, including but not limited to Model P-140 disc pelletizers manufactured by Mars Mineral, Mars, Pa. Typical Pelleter Disks 130, 160 form pellets to the desired size at a rate of up to 10 tons per hour. Pelleter Disks 130, 160 can be further equipped with a discharge chute, dust hood, adjustable operating angle, TEFC motor, and a proportioning spray system.

During the second stage and formation of shelled pellets, hopper 140 feeds a blend of additional, or virgin RAS and hydrated lime to Pelleter Disk 160, containing RAS core pellets from Pelleter Disk 130. Further, Lignin from tank 152 and a water-resistant agent from tank 154 can be combined with water in tank 150, which in turn, is then added to the material in Pelleter Disk 160 to form the shelled pellets. Solutions from each of these tanks can be spray metered 102B, C, D accordingly.

With, continuing reference to FIG. 4, the pellets are transported via transfer belt 116 to Dryer Drum 170. After drying, the pellets are conveyed 118 to Silo 180. Silo 180 can be a 100-ton capacity steel bin, equipped with a bin activator, knife gate valve, rotary feeder and level indicators, and further equipped with a supporting structure to elevate the Silo 180 for drive-through truck traffic.

A master control center (not shown) can be used to provide controls and programmable logic for the entire system 100.

EXAMPLES

The following disclosed embodiments are merely representative of the invention which may be embodied in various forms. Thus, specific structural, functional, and procedural details disclosed in the following example are not to be interpreted as limiting.

In the following example, blends of neat asphalt and asphalt extracted from recycled asphalt waste material such as RAP and RAS were tested using FTIR spectroscopy, under the premise that an increase in viscosity of aged binders is related to an increase in their carbonyl content.

Example A

In order to evaluate the effect of addition of bio-oil on recycled asphalt waste material, specifically RAP, the following study was prepared: as illustrated in FIG. 2, a sample-blend of 1 part aromatic corn oil was blended with 5 parts of comminuted shingle asphalt, bringing the PG grade viscosity closer to that of the original PG paving grades.

It is contemplated that any suitable recycling oil that meets ASTM D4552, RA-1 can be used. It is further contemplated that the use of biodiesel demonstrates reconstitution of RAP and RAS better than many expensive amines or ester/heavy vacuum gas oil (HVGO) combinations. Additional samples (not shown) of RAS/bio-oil with different ratios (from about 85 wt. % to about 15 wt. % down to from about 97 to about 3), after weathering through a summer and a winter, show significant improvement in flexibility, adhesion and cohesiveness.

Example B

In order to evaluate the effect of biodiesel on RAS-containing asphalt mixes including RAS pellets in accordance with the present embodiments, the following samples and controls over a 10 month period were prepared: (Sample 1, first control) RAS pellets prepared in accordance with the present embodiments having about 10 wt. % bio-oil, dated March 2014; (Sample 2, second control) RAS pellets prepared on in accordance with present embodiments having about 10 wt. % bio-oil, dated December 2014; (Sample 3, control binder) laboratory stock; and virgin PG 64-22 asphalt, (Sample 4, test sample) ground RAS, dated January 2015. Table 1 is provided after the Samples and testing is described below.

Sample 1 (first control, March 2014); to determine the binder, minus No. 200 content, and PG classification on the Abson; in addition, to determine the optimum mixing time and temperature for 5% RAS pellets introduced into a local asphalt concrete mix using a PG 64-22 asphalt cement.

Sample 1 was extracted to determine the asphalt binder content and minus No. 200 sieve content (AASHTO T164-A and T30). Extracted binder, measured at 16.5 wt. % was recovered via the Abson Method (AASHTO R59), and the recovered binder was then submitted for testing PG characteristics. As shown in Table 1, the minus No. 200 sieve content was measured at 51%, and the pass/fail temperature was determined to be 102.9° C. for the Dynamic Shear in the RTFO Mode.

Next, additional binder was recovered from extracting Sample 1. The recovered binder was heated to 300° F. and treated with 5% pure corn oil (by weight of asphalt) and stirred until homogeneous. As indicated in Table 1, the pass/fail temperature was determined to be 90.0° C. for the Dynamic Shear in the RTFO Mode.

There was insufficient amount of Sample 1 remaining to perform the RAS pellets mixing temperature testing and mixing with a local mix containing PG 64-22 asphalt binder.

Sample 2 (second control, December 2014); RAS pellets made in accordance with the present embodiments in December 2014 in a separate batch from Sample 1. The testing program consisted of continuing the initial program that was interrupted by lack of Sample 1, binder content and minus No. 200 determined. The binder recovered was tested for Penetration at 77° F., 5 grams, and 60 seconds. The penetration test resulted in a value of 15 dmm.

The extracted binder content was 18.3%, and the minus No. 200 sieve content was 28%, as shown in Table 1. Additional RAS pellets were extracted and the recovered binder was then submitted for testing PG characteristics. As shown in Table 1, the pass/fail temperature was determined to be 138.7° C. for the Dynamic Shear in the RTFO Mode.

Sample 2 to be extracted and binder recovered were ground in a mortar and pestle to facilitate a more efficient extraction process. Another penetration test was conducted which resulted in a value of 7 dmm. See Table 1. It is uncertain if the difference from the 15 dmm value was related to the mortar and pestle processing, variable consistency of the RAS pellets (Sample 2), or testing variability. ASTM Standard Method D5 (penetration of bituminous materials) indicates that the multi-laboratory acceptable range of two results at 77° F. would be 7 dmm for penetrations less than 60 dmm.

The pass/fail low temperature Dynamic Shear ($G^*\sin\delta\cdot kPa$) from PAV at 100° C. was found to be 29.9° C. for Sample 2. Due to the extremely viscous state of the PAV aged recovered binder, poor adhesion to the upper and lower 8 mm DSR plates resulted in subjective test data for Creep Stiffness and results were deemed unobtainable. The samples broke during test. Therefore, Slope m-value was also unobtainable.

Next, the mixing test to evaluate the minimum mixing temperature to achieve full coating within a laboratory mixing time of 90 to 120 seconds was not conclusive. We found the RAS pellets (Sample 2) were not affected by heating at reasonable laboratory mixing temperatures. We heated about 150 grams of RAS pellets (Sample 2) in a forced draft oven set at 375° F. for two hours. The pellets did not show any sign of physical change as compared to the appearance at ambient laboratory temperature. We concluded the pellets would be broken down more readily in a plant drum mixer than what we saw in a laboratory Hobart mixer fitted with a wire whip. Therefore, the recommended virgin laboratory mixing temperature of 305° F. was used which gave full coating of the aggregate and RAS pellets (Sample 2) between 90 and 120 seconds of mixing.

The conventional Marshall asphalt concrete (AC) mixtures produced in the Phoenix Metropolitan area require either PG 70-10, or PG 76-16 due to the hot climate. Therefore, the first step required was to take one of our local mixes and verify it with a PG 64-22 asphalt cement (control binder, Sample 3). The verification testing using a Holly-Frontier PG 64-22 proved satisfactory for verifying the mixture volumetric properties.

Five percent Sample 2 RAS pellets were introduced into an asphalt mix containing a total binder content of 5.5% by weight of total mix. The proportion of virgin PG 64-22 binder (Sample 3, control binder) was adjusted to compensate for the contributed 1.05% RAS binder, Physical properties of the mix were determined and compared to the physical properties of the mix that did not contain any RAS. Test results indicated the asphalt concrete mixture containing 5% RAS pellets (Sample 2) has 0.5% higher mix air voids than the mixture without RAS pellets. However, the mix containing the RAS pellets (Sample 2) is considered to substantially verify the virgin asphalt mix.

A portion on the lab mixture containing the 5% RAS pellets was extracted and the asphalt binder recovered via the Abson Method. The recovered binder was then submitted for PG binder classification. The results of this testing as shown in Table 1 yield a Grade of PG 72-15.

The low volume mix containing 5.5% PG 64-22 and no RAS pellets was extracted and recovered. The extracted binder content was 5.6% by weight of total mix. The recovered binder resulted in an actual Grade of PG 70-17. When compared with the data above, it would indicate that 5% RAS pellets can replace 1.05% virgin binder in an asphalt concrete mix without significantly affecting the binder properties. The passing the No. 200 sieve increased 0.6% with the introduction of the RAS pellets (Sample 2).

The above mentioned findings are presented in Table. 1. Note that data for short term oven aging was 2 hours in a forced draft oven at the compaction temperature of 285° F.

TABLE 1

| Material | Source | Date submitted | Treatment | % Binder | High Pass/Fail temperature, ° C. | Comments |
| --- | --- | --- | --- | --- | --- | --- |
| RAS pellets (Sample 1) | Centralia, WA | March 2014 | None | 16.5 | 102.9 | 51% minus No. 200 |
|  |  |  | 300° F., 5% corn oil |  | 90.0 |  |
| RAS pellets (Sample 2) | Eastern US | December 2014 | None | 18.3 | 138.7 | PG 138-XX, 28% minus No. 200. Penetration of 15 (WT.) Penetration of 7 (AMEC) |
|  |  |  | Blended with PG 64-22 in AC mix | — | 72.9 | PG 72-15 after short term oven aging |
| Virgin PG 64-22 (Sample 3) | Holly Frontier | Laboratory stock | None (Virgin Asphalt Mix) | — | 70.5 | PG 70-17 after short-term oven aging |
| Ground RAS (Sample 4) | — | January 2015 | None | 22.4* | — |  |
|  |  |  | 10% Bio-diesel, 100° F. | 31.9 | — | Too soft to be tested |
|  |  |  | 5% Bio-diesel 100° F. | 27.8 | 75.6 | PG 75-XX |

*Computed from extracted 5% and 10% Bio-diesel blends.

This increase in the passing No. 200 is still within any anticipated tolerance during production, and can be adjusted for during mix designing.

Sample 4, test sample, January 2015, a gallon "baggie" of ground RAS, add 10% biodiesel and allow to cure at 100° F. for three days before extracting and recovering the binder. This was intended to determine if biodiesel was a more efficient diluent than bio-oil. One gallon of biodiesel was purchased from Western States Petroleum, Inc. The biodiesel was identified as B99 which is 99% biodiesel and 1% diesel #2.

The ground RAS (Sample 4, test sample) was treated and sealed in a gallon can. Before placing the can into a 100° F. environmental chamber, a small hole was punched into the lid to allow release of any pressure. At the end of the curing period, the ground RAS with 10% biodiesel mixture was extracted by AASHTO T164-A, and recovered by AASHTO R59. The recovered binder appeared too soft to test (penetration possibly greater than 300 dmm). Further testing was discontinued.

Based on what we saw after the addition of 10% Bio-diesel to the ground RAS, the biodiesel was reduced to 5% and allow to cure at 100° F. for three days before extracting and recovering the binder. The RAS was cured in the same manner as above for the 10% addition of biodiesel. At the end of the curing period, the ground RAS and biodiesel mixture was extracted by AASHTO T164-A, and recovered by AASHTO R59. The recovered binder penetration tested at 94 dmm. The recovered binder was then measured having a high temperature graded out to be 75. See Table 1. However, rheometer test data at 0° C. and –6° C. was indeterminable, due to the sample exceeding deflection at 0° C. and breaking in half at –6° C. As such, the material was too soft to run at 0° C. and too stiff at –6° C.

From the above mentioned data, it can be discerned that when 5% RAS pellets are used in an asphalt cement (AC) hot mix as an addition to virgin PG 64-22 asphalt cement, the resulting binder has a grade similar to typical PG 70-10 virgin binder. The extracted PG 64-22 virgin binder used as the control mixture when recovered, resulted in a PG classification of PG 70-17, which indicates an increase of one grade which equates to an average 7-day maximum pavement design temperature of 70° C., and a minimum pavement design temperature of –16° C. Comparison of the two recovered binders indicate the slight hardening of the virgin mix with PG 64-22 was due to the lab mixing, and Abson Recovery process. There was no significant change in the extracted gradation between the mixes with and without 5% RAS pellets. The slight increase in the passing No. 200 sieve, with the 5% RAS pellets, can be adjusted for during mix design.

In accordance with Table 1, the introduction of 5% RAS pellets into the conventional mix with 5.5% total binder (RAS and virgin) calculates to be 19.03% RAS binder, and 80.97% virgin binder, percent by weight of total binder in mix. To comply with a project-specified virgin binder grade, the test data appears to indicate that one grade softer of virgin asphalt binder may be necessary when RAS pellets are used, and when they contribute between 15% and 20% RAS binder, percent by weight of total binder in mix (RAS and virgin binder). Another way to reduce the RAS binder in the mix is to limit the quantity of RAS pellets used in the mix. Based on the RAS binder (18.3%) in the pellets, this equates to 19.03% RAS binder contribution, or 3.8% RAS binder contribution for every 1% change in RAS pellets. Therefore, 3.9% RAS pellets would equal 14.85% RAS binder contribution.

As expected, asphalt extracted from RAS pellets is very stiff when compared to conventional paving binders. Limited testing on ground RAS shows that performance of this material can be improved by biodiesel treatment which appears to be a more efficient diluent than bio-oil.

Additional testing can be conducted to compare the moisture sensitivity characteristics between an AC mix (preferably the same one used for the initial comparison testing) and the same mix with 5% RAS pellets. Moisture sensitivity testing could be conducted using Tensile Strength Ratio, Hamburg Wheel Tracking device (Rut Tester), or both.

From the foregoing description it will be apparent that modifications can be made to the disclosed embodiments herein without departing from the teachings of the invention.

The instant invention may be embodied in other forms or carried out in other ways without departing from the spirit or essential characteristics thereof. The present disclosure is therefore to be considered as in all respects illustrative and not restrictive, the scope of the invention being indicated by the appended claims, and all equivalency are intended to be embraced therein. One of ordinary skill in the art would be able to recognize equivalent embodiments of the instant invention and be able to practice such embodiments using the teaching of the instant disclosure and only routine experimentation.

What is claimed is:

1. An asphalt pavement comprising:
a first stage mix comprising:
recycled asphalt shingles material; and
a softening agent; wherein the softening agent is selected from the group consisting of biofuels, bio-oils, and combinations thereof;
a second stage mix comprising:
virgin recycled asphalt shingles material;
hydrated lime; and,
a water-resistant modified lignin sulfate binder; and
a performance grade neat asphalt,
wherein the performance grade neat asphalt is combined with a combination of the second stage mix with the first stage mix.

2. The asphalt pavement of claim 1, wherein the softening agent is biodiesel.

3. The asphalt pavement of claim 1, further comprising recycled asphalt pavement.

4. The asphalt pavement of claim 1, wherein the recycled asphalt shingles material in the first stage mix combined with the virgin recycled asphalt shingles material in the second stage mix ranges in an amount from about 7.5 wt. % to about 10 wt. % of the asphalt pavement.

5. The asphalt pavement of claim 1, wherein the combination of the first stage mix and the second stage mix is combined with the performance grade neat asphalt without having to lower the performance grade of the performance grade neat asphalt.

6. An asphalt pavement comprising:
a first stage mix comprising:
recycled asphalt shingle waste; and
a softening agent; wherein the softening agent is selected from the group consisting of biofuels, bio-oils, and combinations thereof;
a second stage mix comprising:
virgin recycled asphalt shingle waste;
hydrated lime; and,
a water-resistant modified lignin sulfate binder; and
a performance grade neat asphalt,
wherein the performance grade neat asphalt is combined with a combination of the second stage mix with the first stage mix.

7. The asphalt pavement of claim 6, further comprising recycled asphalt pavement.

8. The asphalt pavement of claim 7, wherein the recycled asphalt shingle waste in the first stage mix combined with the virgin recycled asphalt shingle waste in the second stage mix ranges in an amount between 7.5 wt. % to 10 wt. % of the asphalt pavement.

9. The asphalt pavement of claim 8, wherein the combination of the first stage mix and the second stage mix is combined with the performance grade neat asphalt without having to lower the performance grade of the performance grade neat asphalt.

10. An asphalt pavement comprising:
recycled asphalt shingle waste and
a softening agent combined in a first mixture;
virgin recycled asphalt waste,
hydrated lime, and
a water-resistant modified lignin sulfate binder combined in a second mixture; and
a performance grade neat asphalt,
wherein the performance grade neat asphalt is combined with the first mixture and the second mixture.

11. The asphalt pavement of claim 10, wherein the softening agent is selected from the group consisting of biofuels, bio-oils, and combinations thereof.

12. The asphalt pavement of claim 11, further comprising recycled asphalt pavement.

13. The asphalt pavement of claim 12, wherein a combination of the recycled asphalt shingle waste from the first mixture and the virgin recycled asphalt shingle waste from the second mixture ranges in an amount between 7.5 wt. % to 10 wt. % of the asphalt pavement.

14. The asphalt pavement of claim 13, comprising a performance grade approximately equal to a performance grade of the performance grade neat asphalt.

* * * * *